United States Patent
Fukuda (10) Patent No.: US 10,790,073 B2
(45) Date of Patent: Sep. 29, 2020

(54) WATER STOP STRUCTURE FOR ELECTRIC WIRE BUNDLE

(71) Applicant: SUMITOMO WIRING SYSTEMS, LTD., Mie (JP)

(72) Inventor: Takao Fukuda, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 16/624,981

(22) PCT Filed: Jun. 22, 2018

(86) PCT No.: PCT/JP2018/023743
§ 371 (c)(1),
(2) Date: Dec. 20, 2019

(87) PCT Pub. No.: WO2019/009096
PCT Pub. Date: Jan. 10, 2019

(65) Prior Publication Data
US 2020/0168361 A1 May 28, 2020

(30) Foreign Application Priority Data
Jul. 3, 2017 (JP) .................. 2017-130530

(51) Int. Cl.
*H01B 7/285* (2006.01)
*H02G 15/013* (2006.01)
(Continued)

(52) U.S. Cl.
CPC ......... *H01B 7/285* (2013.01); *B60R 16/0222* (2013.01); *H01B 13/32* (2013.01); *H02G 15/013* (2013.01); *H02G 3/22* (2013.01)

(58) Field of Classification Search
CPC .... H01B 7/285; H01B 13/32; B60R 16/0222; H02G 15/013; H02G 3/22
(Continued)

(56) References Cited

U.S. PATENT DOCUMENTS

| | | | | | |
|---|---|---|---|---|---|
| 4,703,997 | A | * | 11/1987 | Ijiri | ...................... G02B 6/4407 385/109 |
| 4,711,523 | A | * | 12/1987 | Iri | .......................... H01B 7/288 385/109 |

(Continued)

FOREIGN PATENT DOCUMENTS

| JP | 5-326046 | 12/1993 |
|---|---|---|
| JP | 9-102222 | 4/1997 |

(Continued)

OTHER PUBLICATIONS

International Search Report issued in International Patent Application No. PCT/JP2018/023743, dated Aug. 7, 2018 (with English translation).

(Continued)

*Primary Examiner* — Sherman Ng
(74) *Attorney, Agent, or Firm* — Greenblum & Bernstein, P.L.C.

(57) ABSTRACT

The purpose of the present invention is to allow a water stop performance between electric wires to be maintained as much as possible even when the electric wires are bent. A water stop structure for an electric wire bundle includes an electric wire bundle in which a plurality of electric wires are bundled together, a filler with which gaps between the plurality of electric wires are filled while maintaining fluidity and viscosity in at least a portion of an extension direction of the electric wire bundle, and a covering body covering a circumference of the portion of the electric wire bundle filled with the filler.

7 Claims, 4 Drawing Sheets

(51) Int. Cl.
   *B60R 16/02*   (2006.01)
   *H01B 13/32*   (2006.01)
   *H02G 3/22*    (2006.01)

(58) Field of Classification Search
   USPC ..................................................... 174/70 R
   See application file for complete search history.

(56) References Cited

U.S. PATENT DOCUMENTS

| | | | | | |
|---|---|---|---|---|---|
| 5,270,487 | A | * | 12/1993 | Sawamura | H02G 3/22 |
| | | | | | 174/152 G |
| 2002/0125024 | A1 | * | 9/2002 | Yashima | H01B 7/285 |
| | | | | | 174/5 SB |
| 2006/0048965 | A1 | * | 3/2006 | Ootsuki | H01R 13/52 |
| | | | | | 174/74 A |

FOREIGN PATENT DOCUMENTS

| | | |
|---|---|---|
| JP | 11-345522 | 12/1999 |
| JP | 2000-209749 | 7/2000 |
| JP | 2012-28114 | 2/2012 |

OTHER PUBLICATIONS

International Preliminary Report on Patentability issued in International Patent Application No. PCT/JP2018/023743, dated Nov. 12, 2018 (English translation).
Official Communication issued in International Bureau of WIPO Patent Application No. PCT/JP2018/023743, dated Aug. 7, 2018.

\* cited by examiner

WATER STOP STRUCTURE FOR ELECTRIC WIRE BUNDLE

FIELD OF THE INVENTION

The present invention relates to a technology for stopping water between electric wires.

BACKGROUND OF THE INVENTION

In Patent Literature 1, a configuration is disclosed in which, at a portion of a wire harness that is inserted through a small-diameter tubular portion of a grommet, a sealing agent is applied to an electric wire group configuring the wire harness, an outer periphery of the sealing agent application portion is covered with a sheet, only both ends on opening sides of the sheet in a length direction are fastened with a tape, and the sealing agent is unlikely to penetrate to an exterior from the tape-fastened portion and is forced to penetrate toward a cross sectional center of the wire harness between the tapes. As the sealing agent, applying a high viscosity or a non-liquid sealing agent such as silicone is disclosed.

RELATED ART

Patent Literature

Patent Literature 1: Japanese Patent Laid-open Publication No. 2000-209749

SUMMARY OF THE INVENTION

Problems to be Solved by the Invention

However, the sealing agent disclosed in Patent Literature 1 hardens in gaps between the electric wires after application. Therefore, when assembling the grommet to a vehicle or after doing so, the sealing agent may break when the electric wire bundle extending from the grommet is bent. Accordingly, there is a possibility that water stop performance cannot be maintained.

In order to avoid the above, a no bending zone of the electric wire bundle may be provided with some length at the front and back of the grommet.

However, due to a layout and the like for a space to arrange the grommet in the vehicle, it may be difficult to secure enough no bending zone of the electric wire bundle.

In view of this, a purpose of the present invention is to allow water stopping performance between electric wires to be maintained as much as possible even when an electric wire bundle is bent.

Means for Solving the Problems

In order to resolve the above-noted issues, a water stop structure for an electric wire bundle according to a first aspect includes an electric wire bundle in which a plurality of electric wires are bundled together, a filler with which gaps between the plurality of electric wires are filled while maintaining fluidity and viscosity in at least a portion of an extension direction of the electric wire bundle, and a covering body covering a circumference of the portion of the electric wire bundle filled with the filler. The filler has fluidity which enables flow so as to fill the gaps between the electric wires even when gaps are created while the covering body covers the circumference of the portion of the electric wire bundle filled with the filler.

A second aspect is the water stop structure for an electric wire bundle according to the first aspect, in which the filler is grease with water repellency.

A third aspect is the water stop structure for an electric wire bundle according to one of the first and second aspects, in which a fastening member is provided respectively to both end side portions of the portion of the electric wire bundle filled with the filler, in the extension direction of the electric wire bundle.

A fourth aspect is the water stop structure for an electric wire bundle according to any one of the first to the third aspects, further including a grommet having a tube into which the portion of the electric wire bundle filled with the filler is inserted, and a mounting portion that is formed so as to spread outward from the tube and that can be mounted to an attachment hole formed in an attachment panel.

A fifth aspect is the water stop structure for an electric wire bundle according to any one of the first to fourth aspects, in which penetration of the filler is between 200 to 400.

A sixth aspect is the water stop structure for an electric wire bundle according to any one of the first to fifth aspects, in which an oil separation degree of the filler after passing 24 hours at 100° C. is 0%.

A seventh aspect is the water stop structure for an electric wire bundle according to any one of the first to sixth aspects, in which an amount of evaporation of the filler after passing 22 hours at 100° C. is equal to or below 0.1%.

An eighth aspect is the water stop structure for an electric wire bundle according to the third aspect, in which the fastening member fastens the electric wire bundle such that the gaps between the plurality of electric wires are smaller than the other portions.

Effect of the Invention

According to the first aspect, the filler is filled in the gaps between the plurality of electric wires while maintaining fluidity and viscosity in at least a portion of the extension direction of the electric wire bundle, and the covering body covers the circumference of the portion of the electric wire bundle filled with the filler. Therefore, even when the electric wire bundle is bent, it is easy to maintain the state where the filler is filled in the gaps between the plurality of electric wires on an inner side of the covering body. In view of this, the water stop performance between the electric wires can be maintained as much as possible even when the electric wire bundle is bent.

According to the second aspect, the filler has water repellency and therefore, water infiltration due to a capillary state can be prevented.

According to the third aspect, the filler is prevented from escaping to an exterior through gaps between the electric wires. Accordingly, water stopping between the electric wires can be maintained as much as possible.

According to the fourth aspect, the grommet is mounted to the attachment hole formed in the attachment panel and the portion of the electric wire bundle filled with the filler is inserted through the tube of the grommet. Accordingly, water can be stopped by the grommet on two sides of the attachment panel.

According to the fifth aspect, it is easy to perform an operation for filing the filler in the gaps between the plurality of electric wires and also to maintain the state where the filler is filled in the gaps between the plurality of electric wires.

According to the sixth aspect, the oil separation degree of the filler is 0%, and therefore the water stop performance between the electric wires can be maintained as much as possible.

According to the seventh aspect, the amount of evaporation of the filler after passing 22 hours at 100° C. is equal to or below 0.1%, and therefore the water stop performance between the electric wires can be maintained as much as possible.

MODE FOR CARRYING OUT THE INVENTION

Figure 1:
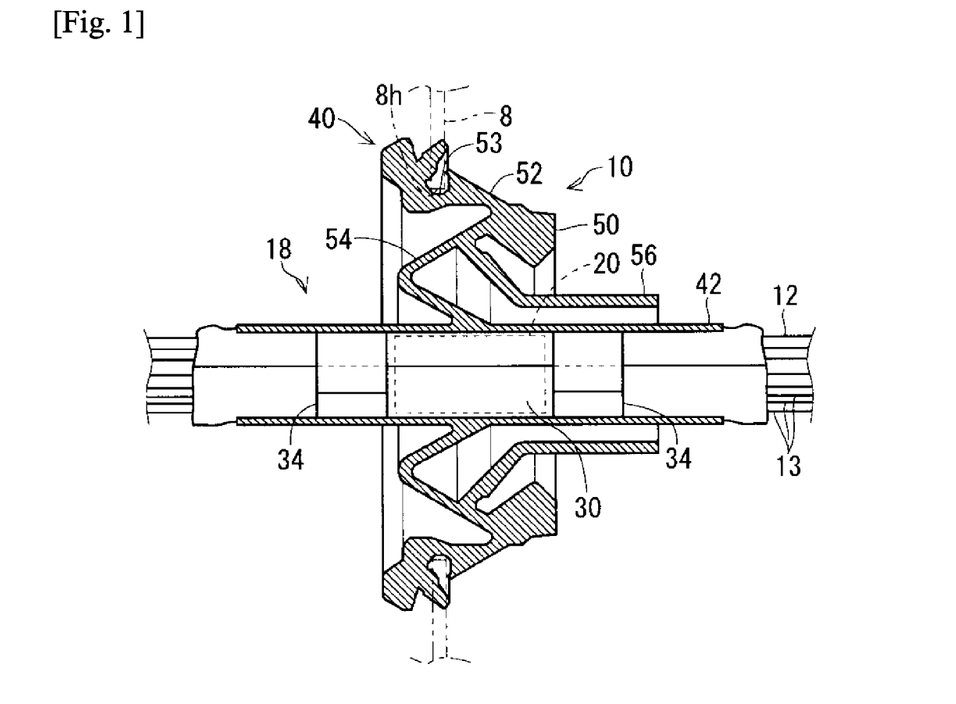
FIG. 1 is a partial cross-sectional view of an electric wire with grommet according to an embodiment.
Figure 2:
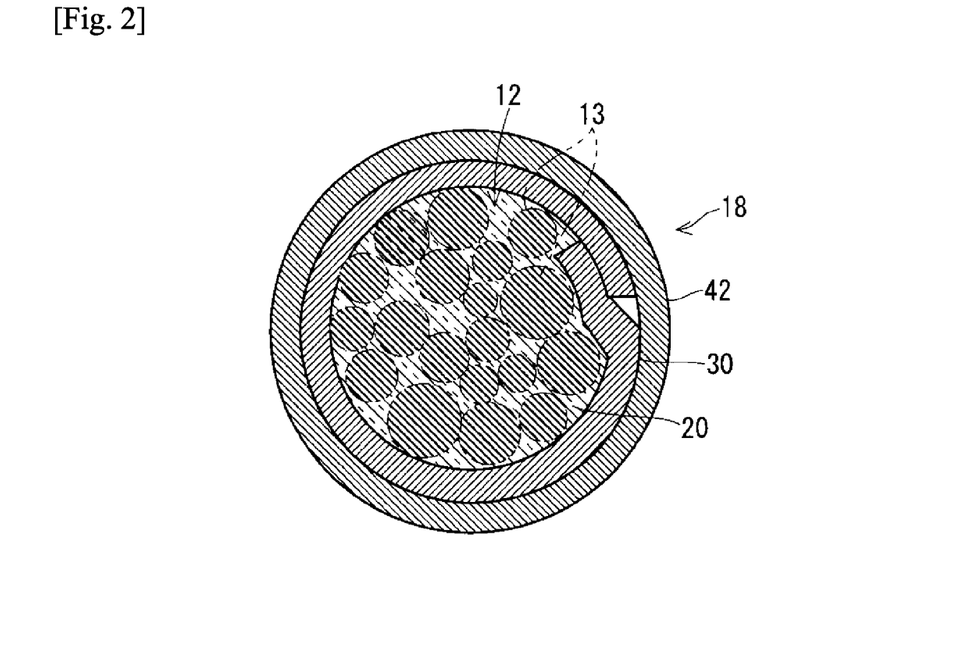
FIG. 2 is a partial cross-sectional view along a filler.
Figure 3:
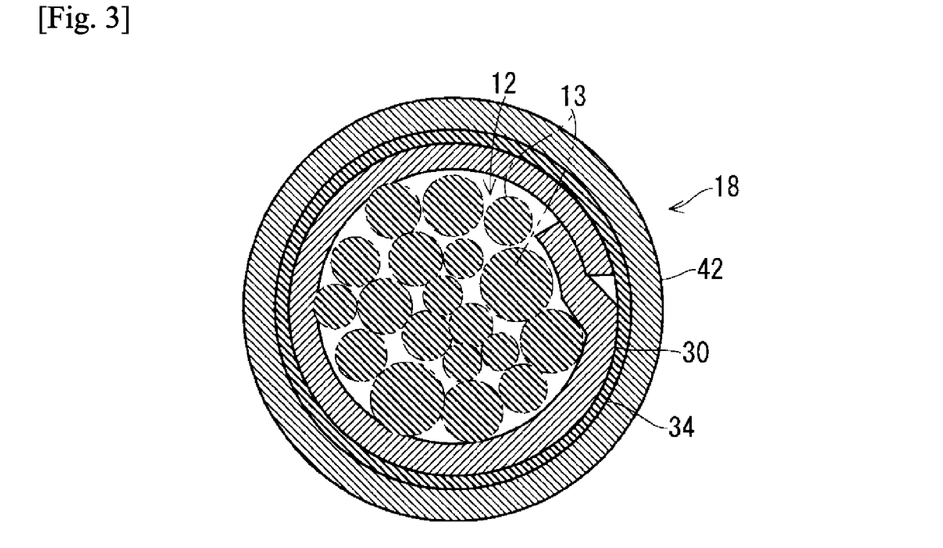
FIG. 3 is a partial cross-sectional view along a fastening member.

Hereafter, a water stop structure for an electric wire bundle according to an embodiment is described. Here, an example is described where a water stop structure for an electric wire bundle 18 is applied to an electric wire with grommet 10. FIG. 1 is a partial cross-sectional view of the electric wire with grommet 10; FIG. 2 is a partial cross-sectional view along a filler; and FIG. 3 is a partial cross-sectional view along a fastening member.

The electric wire with grommet 10 includes an electric wire bundle 12, a filler 20, a covering body 30, and a grommet 40.

The electric wire bundle 12 has a configuration in which a plurality of electric wires 13 are bundled. The electric wire 13 includes a core wire and an insulation coating, for example. The electric wire 13 is an electric wire for a signal or an electric wire. A plurality of electric wire bundles 12 are assumed, for example, to be bundled together while branching in response to a wiring pathway in a vehicle; that is, a wire harness. In a state where the wire harness is assembled to the vehicle, the wire harness is used as a wiring member electrically connecting various electric components mounted in the vehicle. The portion of the wire harness which is inserted through the grommet 40 is configured by bundling together a plurality of electric wire bundles 12 into one. The electric wire bundle 12 may include an optical fiber cable and the like.

The filler 20 is filled in the gaps between the plurality of electric wires 13 while maintaining fluidity and viscosity in at least a portion of the electric wire bundle 12 in an extension direction. In this example, the filler 20 fills a portion of the electric wire bundle 12 which is inserted through a tube 42 of the grommet 40, at a portion arranged in the extension-direction middle portion of the tube 42.

The reason for the filler 20 to have fluidity is that, when the electric wire bundle 12 is bent and an external force acts on the filler 20 between the plurality of electric wire bundles 12, water stop performance is maintained without fracturing the filler 20. Therefore, the fluidity of the filler 20 refers to a property that can maintain the state where the gaps between the plurality of electric wires 13 are filled even when a portion or the entire electric wire 13 is moved, or that enables flow so as to fill gaps even when gaps are created.

The reason for the filler 20 to have viscosity is to maintain the state in which the filler 20 is present between the plurality of electric wires 13 without escaping outside from the gaps between the plurality of electric wires 13. Therefore, the viscosity of the filler 20 refers to a property where the filler 20 does not escape outside of the covering body 30 through the gaps between the plurality of electric wires 13 in a state where the water stop structure for an electric wire bundle 18 is assembled to an application location of the electric wire bundle 12.

As the filler 20 noted above, it is preferable to use grease, particularly grease having water repellency. For example, the filler 20 may be configured by only one type of grease. The grease is created by dispersing a thickening agent in raw material base oil. The grease having water repellency is grease that repels water on a surface without containing a surfactant, water-absorbing polymer, and the like.

The filler 20 noted above preferably maintains the fluidity and viscosity of the filler 20 during a period from manufacturing to assembling the water stop structure for an electric wire bundle 18 to the vehicle and the like, and furthermore, in a use environment of the water stop structure for an electric wire bundle 18 during a period of normal use of the vehicle after assembling the water stop structure for an electric wire bundle 18 to the vehicle and the like (such as in the environment of a vehicle engine compartment).

Preferable examples of the filler 20 are described later.

The covering body 30 covers a circumference of the portion of the electric wire bundle 12 filled with the filler 20. Accordingly, the covering body 30 is configured such that the filler 20 does not escape outside from the gaps between the plurality of electric wires 13. In this example, the covering body 30 covers, in the extension direction of the electric wire bundle 12, the circumference of the portion of the electric wire bundle 12 filled with the filler 20 and the outer sides on both ends thereof.

As the covering body 30, a configuration can be used where a sheet-shaped member in which the filler 20 does not pass through an inside or outside of the member is wrapped around an outer circumference of the electric wire bundle 12. As the covering body 30, for example, a foamed sheet such as urethane, and more preferably an independent foamed sheet can be used. The covering body may also have a configuration instead in which a thermal contraction tube and an adhesive tape are spirally wrapped.

In this example, the length dimension of the covering body 30 in the extension direction of the electric wire bundle 12 is greater than the length dimension of the tube 42 of the grommet 40. Both end portions of the covering body 30 extend outward from both end portions of the tube 42.

Also, in this example, a fastening member 34 is provided respectively to both end side portions of the portion of the electric wire bundle 12 filled with the filler 20, in the extension direction of the electric wire bundle 12. The fastening member 34 is wrapped around the outer circumference of the electric wire bundle 12 and fastens the electric wire bundle 12 such that the gaps between the plurality of electric wires 13 are smaller than the other portions. In this example, the fastening member 34 is configured by an adhesive tape that has an adhesive layer formed on one principal surface of a band-shaped substrate material wrapping around the electric wire bundle 12. In addition, the fastening member 34 is wrapped around the outer circumference of the covering body 30, which maintains the state where the covering body 30 is wrapped around the electric wire bundle 12 as well as keeping the covering body 30 adhered as tightly as possible to the outer circumference of the electric wire bundle 12. Also, the fastening member 34 is preferably not provided, with respect to the covering body 30, to a location where the filler 20 is filled. Accordingly, it is easy to keep the filler 20 between the two fastening members 34. The fastening member may be directly wrapped around the outer circumference of the electric wire bundle on the inner circumferential side of the covering body. The fastening member may instead be configured by a bundling band, for example.

FIG. 3 illustrates a state where the filler 20 is not present between the plurality of electric wires 13 on the inner circumferential side of the fastening member 34; however, in this portion also, the filler 20 may be partially escaped and filled in the gaps between the plurality of electric wires 13.

In this example, the fastening member 34 is provided at a portion located further inward than both end portions of the tube 42 of the grommet 40 relative to the outer circumference of the covering body 30.

The grommet 40 includes the tube 42 and a mounting portion 50. Here, the entire grommet 40 is a member integrally die-molded with an elastic member such as rubber.

The tube 42 is a tubular portion into which the portion of the electric wire bundle 12 filled with the filler 20 is inserted. The tube 42 is preferably set to an inner diameter dimension that is smaller than an outer diameter dimension of the electric wire bundle 12, and the electric wire bundle 12 is inserted inside the tube 42 in a state where the tube 42 is expanded. In this state, the tube 42 fastens the electric wire bundle 12. Depending also on a force by which the tube 42 fastens the electric wire bundle 12, the filler 20 is pressed so as to be oriented toward a center of the electric wire bundle 12, enabling the filler 20 to fill the gaps between the plurality of electric wires 13 more reliably.

The mounting portion 50 is formed so as to spread outward from the tube 42 and is configured to be mountable to an attachment hole 8h formed on an attachment panel 8.

Figure 7:
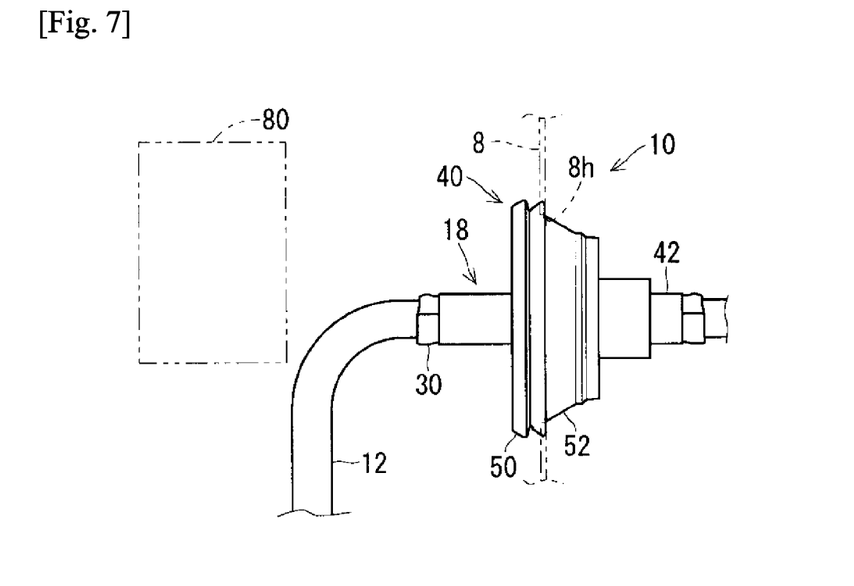
FIG. 7 is an explanatory diagram illustrating a state in which the electric wire with grommet is mounted to an attachment panel.

In this example, the attachment panel 8 is a panel-like portion arranged in a state in which the electric wire bundle 12 is inserted therethrough. The attachment panel 8 is assumed to be a metal attachment panel that separates an engine compartment and a vehicle cabin of the vehicle. A circular attachment hole 8h is formed in the attachment panel 8. By mounting the grommet 40 that is mounted on the electric wire bundle 12 to the attachment hole 8h, the electric wire bundle 12 passes through the attachment hole 8h. In this state, the grommet 40 seals the attachment hole 8h around the electric wire bundle 12 to divide the two sides of the attachment panel such that water does not pass through as well as to protect the electric wire bundle 12 from a circumferential edge portion of the attachment hole 8h.

More specifically, the mounting portion 50 includes a mounting main body 52 that is mounted to the attachment hole 8h and a coupling portion 54 that couples the mounting main body 52 and the tube 42.

The mounting main body 52 is formed annularly, more specifically in an annular shape that gradually contracts in diameter from one side of an axis direction to the other side. On the outer circumference of the mounting main body 52, an annular groove 53 is formed in which the circumferential edge portion of the attachment hole 8h can be installed. Then, when the mounting main body 52 is pressed into the attachment hole 8h with the end portion of the mounting main body 52 having the smaller outer diameter in front, the portion of the mounting main body 52 contacting the circumferential edge portion of the attachment hole 8h is reduced in diameter and deformed. Then, when the mounting main body 52 is pressed into the attachment hole 8h until the circumferential edge portion of the attachment hole 8h is fitted inside the annular groove 53, the mounting main body 52 elastically reverts to an original shape. Accordingly, the state where the circumferential edge portion of the attachment hole 8h is fitted into the annular groove 53 is maintained and a state where the mounting main body 52 is mounted to the attachment hole 8h is maintained.

The coupling portion 54 is an annular portion connecting the inner circumferential portion of the mounting main body 52 and the outer circumferential portion of the tube 42. In this example, the coupling portion 54 connects the outer circumferential portion in the axis-direction middle portion of the tube 42 and the inner circumferential portion in the axis-direction middle portion of the mounting main body 52. The middle portion of the coupling portion 54 between the inner circumferential portion and the outer circumferential portion is bent so as to project toward one axis-direction side of the tube 42, and a posture of the tube 42 can be easily changed with respect to the mounting main body 52.

In addition, an outer tube 56 having an inner diameter dimension larger than an outer diameter dimension of the tube 42 projects at a portion of the coupling portion 54 that is closer to the mounting main body 52.

The grommet 40 does not need to have the configuration noted above. For example, the tube and the mounting main body may be coupled simply via a disk-shaped portion. The grommet may also have a configuration that combines a resin member and an elastic member.

An example of manufacturing the electric wire with grommet 10 is described.

First, the filler 20 is provided to the electric wire bundle 12 in which the plurality of electric wires 13 are bundled.

It is preferred that the arrangement of the filler 20 be configured as follows.

Figure 4:
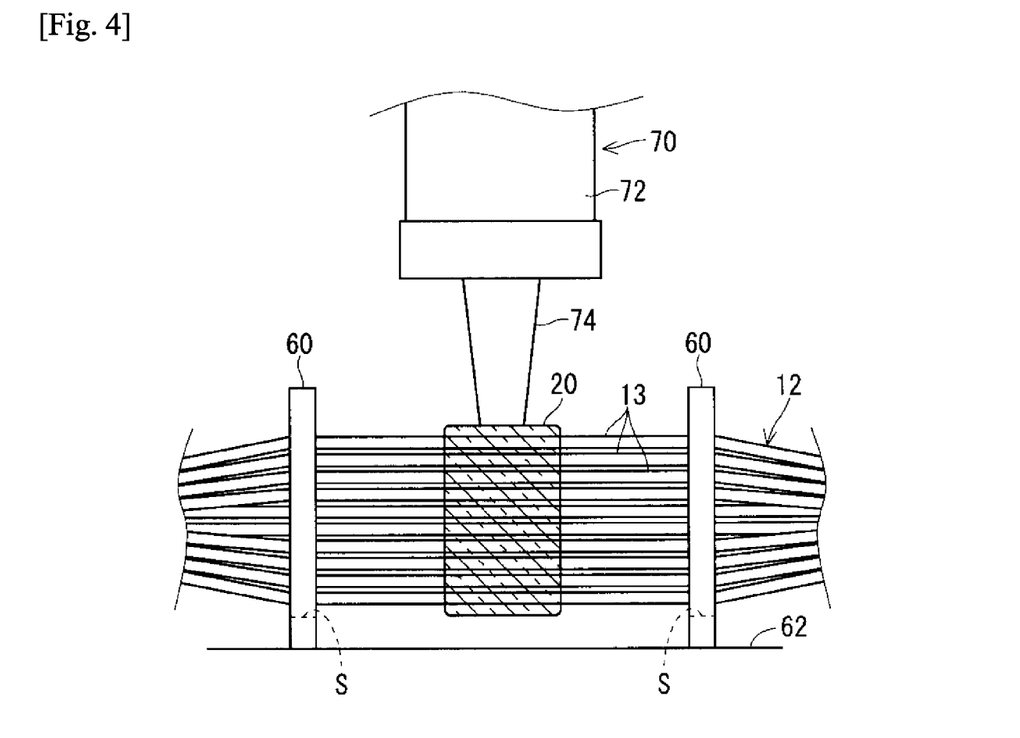
FIG. 4 is an explanatory diagram illustrating a manufacturing process of the electric wire with grommet.

First, as shown in FIG. 4, a pair of alignment jigs 60, formed with a slit S so as to enable the electric wire bundle 12 to be inserted therethrough, are prepared on a work table 62 standing with an interval therebetween. Then, each of the electric wires 13 of the electric wire bundle 12 is inserted through the slit S and arranged such that a location of the electric wire bundle 12 where the filler 20 is to be filled is arranged between the pair of alignment jigs 60. Then, the plurality of electric wires 13 are arranged in parallel between the pair of alignment jigs 60.

In this state, the filler 20 is supplied to each of the plurality of electric wires 13 between the pair of alignment jigs 60. For example, a supply cartridge 70 provided with a nozzle 74 on a tip of a flexible resin tube 72 is prepared and the filler 20 squeezed out from the supply cartridge 70 is supplied so as to be applied to each of the plurality of electric wires 13. At this time, the filler 20 is preferably applied evenly to the respective outer circumferences of the plurality of electric wires 13. The filler 20 may be applied using a brush, a spatula, or the like.

Figure 5:
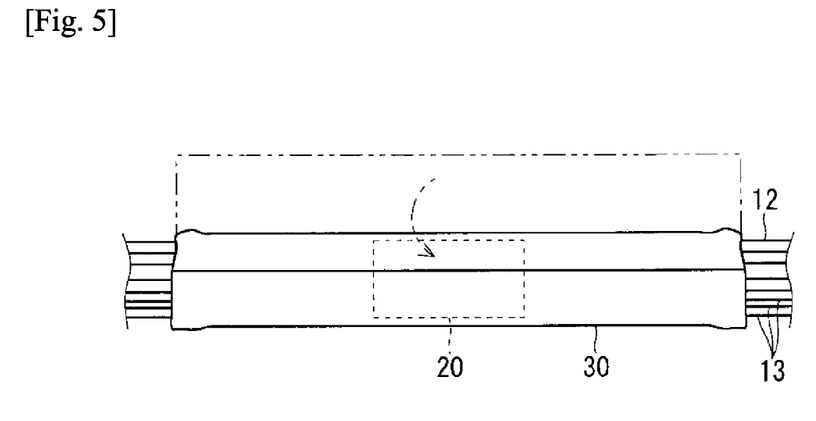
FIG. 5 is an explanatory diagram illustrating a manufacturing process of the electric wire with grommet.

After this, the plurality of electric wires 13 are removed from the pair of alignment jigs 60. As shown in FIG. 5, the covering body 30 is wrapped around the location of the electric wire bundle 12 at which the filler 20 is supplied. At this time, in the extension direction of the electric wire bundle 12, the location of the electric wire bundle 12 at which the filler 20 is filled is arranged as close as possible to the center of the covering body 30. The covering body 30 should wrap around the electric wire bundle 12 at least once.

Figure 6:
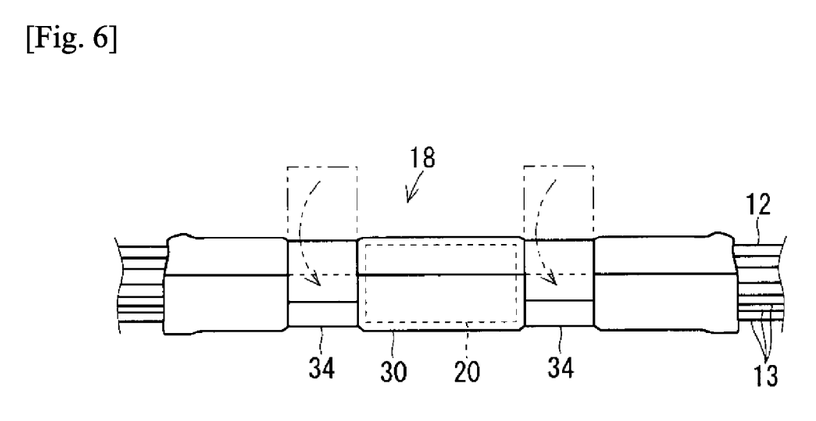
FIG. 6 is an explanatory diagram illustrating a manufacturing process of the electric wire with grommet.

After this, as shown in FIG. 6, the fastening member 34 is wrapped around the outer circumference of the covering body 30 and the state in which the covering body 30 is wrapped around the electric wire bundle 12 is maintained. At this time, in the extension direction of the electric wire bundle 12, portions at both end sides of the location of the electric wire bundle 12 at which the filler 20 is filled are fastened by the fastening member 34. The fastening member 34 should be wrapped around at least once.

Then, while expanding the tube 42 of the grommet 40, the electric wire bundle 12 is inserted through the tube 42 and the tube 42 elastically reverts to the original shape. Accordingly, the electric wire with grommet 10 is manufactured.

According to the water stop structure for an electric wire bundle 18 and the electric wire with grommet 10 configured in this way, the filler 20 is filled in the gaps between the plurality of electric wires 13 while maintaining fluidity and viscosity in at least a portion of the electric wire bundle 12 in the extension direction, and the covering body 30 covers the circumference of the portion of the electric wire bundle 12 filled with the filler 20. Therefore, even when the electric wire bundle 12 is bent while mounting or after mounting the electric wire bundle 12, for example, the filler 20 is unlikely to develop cracks or the like, and it is easy to maintain the state where the filler 20 fills the gaps between the plurality of electric wires 13 on the inner side of the covering body 30. Accordingly, even when the electric wire bundle 12 is bent, the water stop performance between the plurality of electric wires 13 can be maintained as much as possible.

For example, as shown in FIG. 7, a case is considered where the electric wire with grommet 10 is mounted to the attachment hole 8h that is formed in the attachment panel 8 of the vehicle. Because the space to install various components in the vehicle is limited to some extent, a case is posited in which another portion 80 is arranged near the attachment hole 8h. In this case, the portion of the electric wire bundle 12 extending from the grommet 40 may also need to be bent near the grommet 40 to be arranged so as to avoid the portion 80. In this case, even when the electric wire bundle 12 is bent near the grommet 40, the water stop performance between the plurality of electric wires 13 can be maintained as much as possible. Accordingly, the degree of freedom is improved in the arrangement layout of the electric wire bundle 12 and the arrangement layout of vehicle portions near the grommet 40.

Also, even if a gap is created between a plurality of electric wire bundles 12 by pulling out a portion of the plurality of electric wires 13 completely or partially with respect to the others, the filler 20 flows down so as to fill the gap after a certain period of time has elapsed. In this respect also, the water stop performance between the plurality of electric wires 13 can be maintained as much as possible. Accordingly, when attaching the grommet 40 to the attachment panel 8 and the like, even when a gap is created between the electric wire bundles 12 with a force applied from outside at the location of the electric wire bundle 12 where the filler 20 is filled, the gap is blocked after a certain period of time has elapsed. Therefore, an operation restriction for mounting the grommet 40 to the attachment panel 8 can be reduced, which contributes to improving the attachment operation of the grommet 40.

Also, when the plurality of electric wires 13 are bundled and the covering body 30 is wrapped around the circumference thereof, when the fastening member 34 is fastened around the circumference thereof, and when the outer circumference thereof is fastened by the tube 42, in all these cases the filler 20 flows so as to fill the gaps between the plurality of the electric wires 13. Also, even if a gap exists between the plurality of electric wires 13 immediately after the electric wire with grommet 10 is manufactured, after passing the certain period of time thereafter, the filler 20 having fluidity flows so as to fill the gap. Therefore, even when there is variation in the operation, the water stop structure for an electric wire bundle 18 having a stable water stop performance can be manufactured. Accordingly, a defective water stop structure for an electric wire bundle 18 is unlikely to be produced and water stop inspection for all objects is not necessary.

As the filler 20, it is preferable to use grease having water repellency. A common grease that does not contain a surfactant or water-absorbing polymer has water repellency. Accordingly, even if a fine gap is created between the plurality of electric wires 13, water infiltration due to a capillary state can be prevented.

When the grease configuring the filler 20 is applied to a test piece having the same material as the coating of the electric wire bundle 12 and a contact angle is measured by dropping water onto the same, the water repellency preferably has a contact angle of 80 degrees or more, and more preferably, the water repellency is at 80 degrees or more. In addition, when the surface of the applied grease is in contact with water, at the border line where the water is in contact with the surface of the grease, the contact angle is defined by an angle created by the water surface with respect to the surface of the grease.

When the fluidity of the filler 20 is too high, the filler 20 may flow out from the gaps between the plurality of electric wires 13. In addition, when the viscosity of the filler 20 is too high, an operation of filling the filler 20 into a space between the plurality of electric wire bundles 12 (such as the application operation described above) becomes more difficult to perform. In view of this, the penetration of the filler 20 is preferred to be in a range of 200 to 400. More preferably, the penetration is 250 to 350. The penetration is "a worked penetration" defined by JIS K 2220.

In fact, when an operation of applying the filler 20 with the penetration within the 200 to 400 range to the plurality of electric wires 13 is carried out, the operation is confirmed to be easy. In addition, according to an air pressure difference between the engine compartment and the cabin of the vehicle, an air pressure difference is provided before and after the location where the filler 20 is filled in the electric wire bundle 12, and when it is confirmed that no filler 20 is removed from the gaps between the plurality of electric wires 13, it confirms that there are no particular issues.

The viscosity and fluidity of the filler 20 is preferably maintained during a period up to when the water stop structure for an electric wire bundle is mounted to a vehicle or the like which is a mounting target, and also after being mounted to the vehicle or the like which is the mounting target.

In view of this, an oil separation degree of the filler 20 after passing 24 hours at 100° C. is preferably at 0% (significant digit is one digit). The oil separation degree is defined by JIS K 2220.

In addition, when the filler 20 is left in a constant temperature bath at 50° C. for 30 days, the filler is preferably not separated.

Accordingly, in a state where the water stop structure for an electric wire bundle 18 is assembled to the vehicle, the filler 20 can keep the desired viscosity and fluidity noted above, and thereby the water stop performance can be maintained. Also, when the filler 20 is applied to the electric wire bundle 12 and the like, it is possible to perform the application operation or the like without, for example, stirring a substance injected into a container such as the supply cartridge 70, and operability is excellent.

Also, in order to maintain the viscosity and fluidity of the filler 20 during the period when the water stop structure for an electric wire bundle is mounted to the target, an evaporation amount of the filler 20 after passing 22 hours at 100° C. is preferably at or below 0.1% (significant digit is two digits). The amount of evaporation is defined by JIS K 2220.

Accordingly, in the state where the water stop structure for an electric wire bundle 18 is assembled to the vehicle, the filler 20 can keep the desired viscosity and fluidity, and thereby the water stop performance can be maintained.

As the filler 20 satisfying the preferable ranges for each of the penetration, oil separation degree, and amount of evaporation, Molykote G (Molykote is a registered trademark) manufactured by Dow Corning Toray Co., Ltd., can be presented as an example, and product number G-1057 can be given among them.

Also, in the water stop structure for an electric wire bundle 18, the fastening member 34 is provided respectively to a portion in the extension direction of the electric wire bundle 12 at both end sides of the portion of the electric wire bundle 12 filled with the filler 20. Therefore, in the portions at both end sides of the portion of the electric wire bundle 12 filled with the filler 20, the gaps between the electric wires 13 become small and the filler 20 is prevented from passing through the gaps between the electric wires 13 and escaping to the outside. In this respect also, stopping water between the electric wire bundles 12 can be maintained as much as possible.

In addition, the water stop structure for an electric wire bundle 18 is inserted through the tube 42 of the grommet 40. The grommet 40 is mounted to the attachment hole 8h formed in the attachment panel 8 and the portion of the electric wire bundle 12 filled with the filler 20 is inserted through the tube 42 of the grommet 40. Accordingly, water can be stopped by the grommet 40 on the two sides of the attachment panel 8.

[Modification]

In the embodiment described above, a description has been given using an example where the water stop structure for an electric wire bundle 18 is inserted through the grommet 40; however, the water stop structure is also applicable in other locations. For example, a water stop structure incorporating a filler and a covering body may be configured in an electric wire bundle in the extension-direction middle portion of a wire harness and an electric wire bundle on the near side of a connector at the end portion of the wire harness. Accordingly, water movement through the wire harness is prevented.

Each configuration described in each of the above embodiments and each of the modifications can be combined as appropriate so long as they do not contradict each other.

In the above, the present invention is described in detail. However, the above description is, in all aspects, for exemplary purposes and the present invention is not limited thereto. Numerous modifications not given as examples are understood to be conceivable without departing from the scope of the present invention.

DESCRIPTION OF REFERENCE NUMERALS

8 Attachment panel
8h Attachment hole
10 Electric wire with grommet
12 Electric wire bundle
13 Electric wire
18 Water stop structure for electric wire bundle
20 Filler
30 Covering body
34 Fastening member
40 Grommet
42 Tube
50 Mounting portion

The invention claimed is:

1. A water stop structure for an electric wire bundle comprising:
an electric wire bundle in which a plurality of electric wires are bundled together;
a filler with which gaps between the plurality of electric wires are filled while
maintaining fluidity and viscosity in at least a portion of an extension direction of the electric wire bundle; and
a covering body covering a circumference of the portion of the electric wire bundle filled with the filler, wherein
the filler has fluidity which enables flow so as to fill the gaps between the electric
wires even when gaps are created while the covering body covers the circumference of the portion of the electric wire bundle filled with the filler, and
an amount of evaporation of the filler after passing 22 hours at 100° C. is equal to or below 0.1%.

2. The water stop structure for an electric wire bundle according to claim 1,
wherein the filler is grease with water repellency.

3. The water stop structure for an electric wire bundle according to claim 1, wherein a fastening member is provided respectively to both end side portions of the portion of the electric wire bundle filled with the filler, in the extension direction of the electric wire bundle.

4. The water stop structure for an electric wire bundle according to claim 1, further comprising: a grommet having a tube into which the portion of the electric wire bundle filled with the filler is inserted, and a mounting portion that is configured so as to spread outward from the tube and that can be mounted to an attachment hole formed in an attachment panel.

5. The water stop structure for an electric wire bundle according to claim 1, wherein penetration of the filler is between 200 to 400.

6. The water stop structure for an electric wire bundle according to claim 1, wherein an oil separation degree of the filler after passing 24 hours at 100° C. is 0%.

7. The water stop structure for an electric wire bundle according to claim 3, wherein the fastening member fastens the electric wire bundle such that the gaps between the plurality of electric wires are smaller than the other portions.

* * * * *